United States Patent
Luo et al.

(10) Patent No.: US 9,172,561 B2
(45) Date of Patent: Oct. 27, 2015

(54) ADAPTIVE TRANSMISSIONS IN COORDINATED MULTIPLE POINT COMMUNICATIONS

(75) Inventors: Tao Luo, San Diego, CA (US); Durga Prasad Malladi, San Diego, CA (US); Xiaoxia Zhang, San Diego, CA (US); Yongbin Wei, San Diego, CA (US); Juan Montojo, San Diego, CA (US); Ke Liu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 375 days.

(21) Appl. No.: 12/842,752

(22) Filed: Jul. 23, 2010

(65) Prior Publication Data

US 2011/0026421 A1    Feb. 3, 2011

Related U.S. Application Data

(60) Provisional application No. 61/229,702, filed on Jul. 29, 2009.

(51) Int. Cl.
| | |
|---|---|
| *H04L 12/26* | (2006.01) |
| *H04L 25/02* | (2006.01) |
| *H04B 7/02* | (2006.01) |
| *H04B 7/04* | (2006.01) |

(52) U.S. Cl.
CPC ............ *H04L 25/0224* (2013.01); *H04B 7/024* (2013.01); *H04B 7/0417* (2013.01)

(58) Field of Classification Search
USPC .................................. 370/230–235, 328, 252
See application file for complete search history.

(56) References Cited

U.S. PATENT DOCUMENTS

| 5,228,042 A | 7/1993 | Gauthier et al. | |
|---|---|---|---|
| 2006/0268676 A1* | 11/2006 | Gore et al. | ..................... 370/210 |
| 2008/0260059 A1* | 10/2008 | Pan | ................................ 375/260 |

(Continued)

FOREIGN PATENT DOCUMENTS

| CN | 1352505 A | 6/2002 |
|---|---|---|
| CN | 1703032 A | 11/2005 |

(Continued)

OTHER PUBLICATIONS

Catt, "Aspects of Joint Processing in Downlink CoMP", 3GPP Draft, R1-090193, 3rd Generation Partnership Project (3GPP), Mobile Competence Centre, 650, Route Des Lucioles, F-06921 Sophia-Antipolis Cedex, France, no. Ljubljana, Jan. 8, 2009, XP050318126.

(Continued)

*Primary Examiner* — Zewdu A Beyen

(57) ABSTRACT

Systems and methodologies are described that facilitate adaptively communicating data to wireless devices. An access point can precode a dedicated reference signal (DRS) for transmitting to a wireless device, and the wireless device can receive the precoded DRS. The wireless device can determine the precoder by estimating a channel of the DRS and can provide channel condition feedback to the access point. The access point can create data signals including a single or a burst of data transmissions according to the feedback and can precode the data signals using the same precoder. The wireless device can additionally decode the data signals using the precoder. Moreover, the access point can cycle through precoders according to a patterned, random, pseudo-random, and/or similar sequence.

56 Claims, 13 Drawing Sheets

(56) References Cited

U.S. PATENT DOCUMENTS

| | | | | |
|---|---|---|---|---|
| 2010/0091893 | A1* | 4/2010 | Gorokhov | 375/260 |
| 2010/0322176 | A1* | 12/2010 | Chen et al. | 370/329 |

FOREIGN PATENT DOCUMENTS

| | | |
|---|---|---|
| CN | 1731772 A | 2/2006 |
| CN | 1860690 A | 11/2006 |
| CN | 1996974 A | 7/2007 |
| WO | WO2005091517 A1 | 9/2005 |
| WO | WO2008111798 A1 | 9/2008 |
| WO | WO-2008113216 A1 | 9/2008 |

OTHER PUBLICATIONS

Ericsson, "UE specific reference signal pattern", 3GPP Draft, R1-080506, 3rd Generation Partnership Project (3GPP), Mobile Competence Centre, 650, Route Des Lucioles, F-06921 Sophia-Antipolis Cedex, France, vol. RAN WGI, no. Sevilla, Spain, Jan. 10, 2008, XP050109022.

Fujitsu,"Pseudo Transmission Timing Control using Cyclic Shift for Downlink CoMP Joint Transmission", 3GPP Draft, R1-091956, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339429.

International Search Report and Written Opinion—PCT/US2010/043594, International Search Authority—European Patent Office—Feb. 10, 2011.

Motorola, "Coordinated Multi-Point Transmission—Coordinated Beamforming/Precoding and Some Performance Results", 3GPP Draft, R1-090325 Comp Results (Motorola), 3rd Generation Partnership Project (3GPP), Mobile Competence Centre, 650, Route Des Lucioles, F-06921 Sophia-Antipolis Cedex, France, no. Ljubljana, Jan. 8, 2009, XP050318236.

Motorola, "Coordinated Multi-Point Transmission—Exploring Possible System Operations and UE Support", 3GPP Draft, R1-084407 Coordinated Multi-Point Transmission (Motorola), 3rd Generation Partnership Project (3GPP), Mobile Competence Centre, 650, Route Des Lucioles, F-06921 Sophia-Antipolis Cedex, France, no. Prague, Czech Republic, Nov. 5, 2008, XP050317669.

Philips, "Performance of LTE DL MU-MIMO with dedicated pilots", 3GPP Draft, R1-071403, 3rd Generation Partnership Project (3GPP), Mobile Competence Centre, 650, Route Des Lucioles, F-06921 Sophia-Antipolis Cedex, France, vol. RAN WGI, no. St. Julian, Apr. 3, 2007, XP050105346.

QUALCOMM Europe, "Feedback considerations for DL MIMO and CoMP", 3GPP Draft, R1-092055 Feedback Considerations for DL MIMO and CoMP, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339514.

QUALCOMM Europe, "Impact of Downlink CoMP on the Air Interface", 3GPP Draft, R1-090366, 3rd Generation Partnership Project (3GPP), Mobile Competence Centre, 650, Route Des Lucioles, F-06921 Sophia-Antipolis Cedex, France, no. Ljubljana, Jan. 8, 2009, XP050318270.

Section 3.9.1, "Estimating the ST channel at the receiver", In, Arogyaswami Paulraj, Rohit Nabar, Dhananjay Gore, "Introduction to Space-Time Wireless Communications", May 31, 2003, Cambridge University Press, Cambridge (UK), XP002618821.

Huawei et al., "Furthur Discussions on the Downlink Coordinated Transmission—Impact on the radio interface", 3GPP Draft; R1-090129 3GPP, Mobile Competence centre; 650, Route Deslucioles; F-06921 Sophia-antipolis cedex; France, Jan. 7, 2009, XP050318067.

Nortel: "Performance evaluation of CoMP Solutions", 3GPP Draft; R1-090142 (Nortel—Multisite_MIMO_Cooperation_LL_Results), 3GPP Draft; Mobile Competence centre; 650, Route Deslucioles; F-06921 Sophia-antipolis cedex; France, Jan. 7, 2009, XP050318078.

Taiwan Search Report—TW099124960—TIPO—May 3, 2013.

* cited by examiner

ADAPTIVE TRANSMISSIONS IN COORDINATED MULTIPLE POINT COMMUNICATIONS

CROSS-REFERENCE

This application claims the benefit of U.S. Provisional Application Ser. No. 61/229,702, filed Jul. 29, 2009, and entitled "DEDICATED REFERENCE SIGNALS AND ASSOCIATED PHYSICAL DOWNLINK SHARED CHANNELS WITH ADAPTIVE TRANSMISSIONS," the entirety of which is incorporated herein by reference.

BACKGROUND

I. Field

The present disclosure relates generally to wireless communications and more specifically to coordinating communications among multiple transmission points.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating adaptively transmitting dedicated reference and data signals based on channel condition feedback in coordinated multiple point (CoMP) communications. In an example, access points in a CoMP set can transmit dedicated reference signals (DRS) with a predefined precoder (e.g., related to a precoding matrix indicator (PMI)) to a wireless device. The wireless device can measure the DRSs, determine radio conditions of the channel related to the DRSs, and feedback the conditions (e.g., as channel quality indicator (CQI) and/or the like) to one or more of the CoMP access points. The CoMP access points can subsequently transmit one or more data signals (e.g., along with a DRS) to the wireless device based at least in part on the feedback from the wireless device and can precode the one or more data signals using the predefined precoder.

According to an aspect, a method is provided that includes receiving a plurality of similarly precoded data signals with one or more DRSs from one or more access points and determining a channel estimation average over the plurality of similarly precoded data signals or the one or more DRSs to improve decoding thereof. The method further includes decoding the plurality of similarly precoded data signals or the one or more DRSs based at least in part on the channel estimation average.

Another aspect relates to a wireless communications apparatus. The wireless communications apparatus can include at least one processor configured to obtain a plurality of similarly precoded data signals with one or more DRSs from one or more access points and estimate a channel for each of the plurality of similarly precoded data signals or the one or more DRSs. The at least one processor is further configured to average the channel as estimated for each of the plurality of similarly precoded data signals or the one or more DRSs to improve decoding. The wireless communications apparatus also comprises a memory coupled to the at least one processor.

Yet another aspect relates to an apparatus. The apparatus includes means for receiving a plurality of similarly precoded data signals with one or more DRSs from one or more access points and means for determining a channel estimation average over the plurality of similarly precoded data signals or the one or more DRSs to improve decoding thereof. The apparatus also includes means for decoding the plurality of similarly precoded data signals or the one or more DRSs according to the channel estimation average.

Still another aspect relates to a computer program product, which can have a computer-readable medium including code for causing at least one computer to obtain a plurality of similarly precoded data signals with one or more DRSs from one or more access points and code for causing the at least one computer to estimate a channel for each of the plurality of similarly precoded data signals or the one or more DRSs. The computer-readable medium can also comprise code for causing the at least one computer to average the channel as estimated for each of the plurality of similarly precoded data signals or the one or more DRSs to improve decoding.

Moreover, an additional aspect relates to an apparatus including a receiving component that obtains a plurality of similarly precoded data signals with one or more DRSs from one or more access points. The apparatus can further include a DRS decoding component that averages a channel estimation over the one or more DRSs to improve decoding of the plurality of similarly precoded data signals.

According to another aspect, a method is provided that includes applying a precoder to a DRS related to a wireless device, transmitting the DRS to the wireless device, and receiving one or more feedback parameters regarding the DRS related to the wireless device. The method further includes generating one or more data signals comprising one or more data transmissions based at least in part on the one or more feedback parameters, precoding the one or more data signals utilizing the precoder, and transmitting the one or more data signals to the wireless device.

Another aspect relates to a wireless communications apparatus. The wireless communications apparatus can include at least one processor configured to utilize a precoder to precode a DRS specific to a wireless device, transmit the DRS to the wireless device, and obtain one or more feedback parameters based at least in part on receiving the DRS at the wireless device. The at least one processor is further configured to create one or more data signals comprising one or more data transmissions based at least in part on the one or more feedback parameters, precode the one or more data signals according to the precoder, and transmit the one or more data signals to the wireless device. The wireless communications apparatus also comprises a memory coupled to the at least one processor.

Yet another aspect relates to an apparatus. The apparatus includes means for applying a precoder to a DRS related to a wireless device, means for transmitting the DRS to the wireless device, and means for receiving one or more feedback parameters regarding the DRS related to the wireless device. The apparatus also includes means for generating one or more data signals comprising one or more data transmissions based at least in part on the one or more feedback parameters, wherein the means for applying the precoder applies the precoder to the one or more data signals, and the means for transmitting transmits the one or more data signals to the wireless device.

Still another aspect relates to a computer program product, which can have a computer-readable medium including code for causing at least one computer to utilize a precoder to precode a DRS specific to a wireless device, code for causing the at least one computer to transmit the DRS to the wireless device, and code for causing the at least one computer to obtain one or more feedback parameters based at least in part on receiving the DRS at the wireless device. The computer-readable medium can also comprise code for causing the at least one computer to create one or more data signals comprising one or more data transmissions based at least in part on the one or more feedback parameters, code for causing the at least one computer to precode the one or more data signals according to the precoder, and code for causing the at least one computer to transmit the one or more data signals to the wireless device.

Moreover, an additional aspect relates to an apparatus including a precoder applying component that precodes a DRS related to a wireless device at least in part by utilizing a precoder, a transmitting component that communicates the DRS to the wireless device, and a feedback receiving component that obtains one or more feedback parameters regarding the DRS related to the wireless device. The apparatus can further include a data signal generating component that creates one or more data signals comprising one or more data transmissions based at least in part on the one or more feedback parameters, wherein the precoder applying component applies the precoder to the one or more data signals, and the transmitting component communicates the one or more data signals to the wireless device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
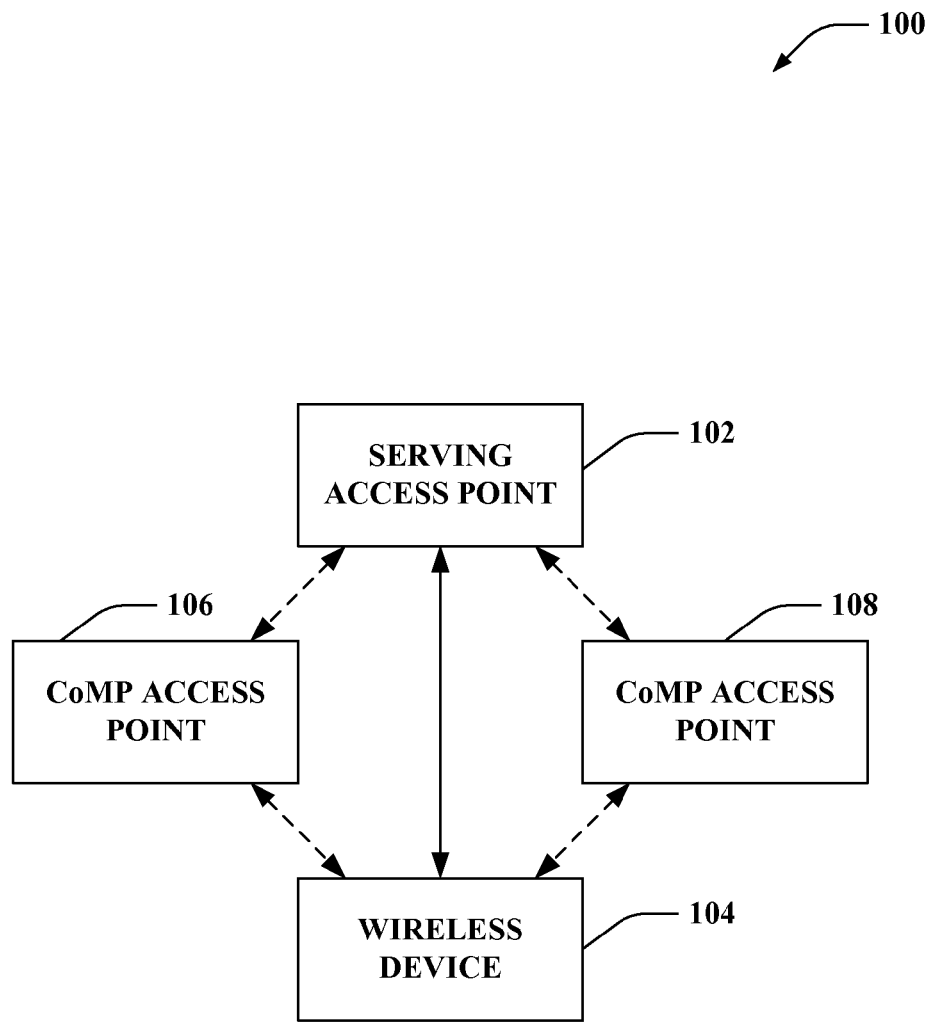
FIG. 1 is a block diagram of a system for providing coordinated multiple point transmissions to a wireless device.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates providing wireless network access to one or more devices using one or more transmission points. System 100 includes a serving access point 102 that provides a wireless device 104 with access to a core network (not shown) over one or more carriers. The one or more transmission points can relate to multiple carriers or other communications resources assigned by the serving access point 102 to wireless device 104 (e.g., multiple-input multiple-output (MIMO) communications). Additionally or alternatively, for example, one or more coordinated multiple point (CoMP) access points 106 and 108 can be provided as the one or more transmission points. In either case, similar data can be transmitted over the multiple carriers and/or by serving access point 102 and CoMP access points 106 and 108 to wireless device 104 to provide CoMP communications. Such communication can allow increased data rates, for example. Serving access point 102 and CoMP access points 106 and 108 can each be substantially any device that provides access to one or more network components, such as a macrocell access point, femtocell or picocell access point, eNB, mobile base station, relay node, a portion thereof, and/or the like. Wireless device 104 can be substantially any device that receives access to a wireless network, such as a mobile device, UE, modem (or other tethered device), a portion thereof, etc.

According to an example, serving access point 102 and CoMP access points 106 and 108 can coordinate transmissions to provide CoMP communications to wireless device 104. As described, for example, serving access point 102 and CoMP access points 106 and 108 can communicate with wireless device 104 according to a network standard (such as 3GPP LTE). In this regard, for example, serving access point 102 can transmit a common reference signal (CRS) to a plurality of wireless devices to facilitate detecting communications from serving access point 102. Similarly, CoMP access points 106 and 108 can transmit substantially similar or different CRSs to the plurality of wireless devices.

Moreover, for example, serving access point 102 can transmit a UE-specific or dedicated reference signal (DRS) to wireless device 104 to facilitate decoding communications from serving access point 102. Serving access point 102, for example, can precode the DRS to provide transmit diversity.

Precoding can be similar to beamforming and can relate to weighing transmission of a signal from a plurality of transmit antennas to modify, diversify, and/or improve received signal power at the receiver. In this regard, serving access point 102 can apply a precoder (e.g., as identified by a precoding matrix indicator (PMI) and associated with a precoding vector) to the DRS and can transmit the precoded DRS to wireless device 104. In addition, for example, CoMP access points 106 and/or 108 can transmit substantially the same DRS as serving access point 102 to wireless device 104 using substantially the same or different precoders in CoMP communications.

Wireless device 104 can receive the DRSs from serving access point 102 and CoMP access points 106 and/or 108, and can measure the DRSs (e.g., by performing channel estimation). In one example, the DRSs can appear as one combined DRS at wireless device 104, and thus wireless device 104 can perform a single measurement over the DRS. Wireless device 104 can additionally determine channel conditions based at least in part on measuring the DRS, such as channel quality indicator (CQI) and/or the like, and can feedback the channel conditions to serving access point 102 as one or more feedback parameters (e.g., over a physical uplink control channel (PUCCH) or similar logical channel resources). In addition, wireless device 104 can discern the precoder, or related precoding vector and/or PMI, utilized by serving access point 102 and the CoMP access points 106 and/or 108 based at least in part on the channel estimation, in one example. In an example, serving access point 102 can provide received feedback over a backhaul link to CoMP access points 106 and/or 108; in another example, CoMP access points 106 and/or 108 can decode the feedback from wireless device 104 transmissions.

Moreover, for example, based at least in part on the one or more feedback parameters from wireless device 104, serving access point 102 can send data signals comprising one or more data transmissions (e.g., a single transmission or burst of multiple transmissions) to wireless device 104. The data transmissions, for example, can relate to one or more packets or other data units. For example, serving access point 102 can determine a modulation and coding scheme (MCS) to utilize in transmitting one or more data transmissions in the data signals based at least in part on the one or more feedback parameters. In addition, serving access point 102 can precode the data signals with the same precoder utilized for the previous DRS based on the feedback. In addition, for example, CoMP access points 106 and/or 108 can similarly transmit substantially the same data signals (e.g., as a single transmission or burst of multiple transmissions) to wireless device 104 based on the feedback as well (e.g., by selecting a MCS based on the feedback), and CoMP access points 106 and/or 108 can precode the data signals with the same precoder it used for precoding the previous DRS. In this regard, for example, wireless device 104 can decode the data signals from serving access point 102 and CoMP access points 106 and/or 108 using the same precoder. Moreover, where serving access point 102 and CoMP access points 106 and/or 108 utilize the precoder for transmitting a burst of multiple data signals, wireless device 104, for example, averages channel estimates over the burst of multiple data signals and/or DRSs related to the data signals, which can improve channel estimation thereof and/or of subsequent data signals precoded with the same precoder.

Figure 2:
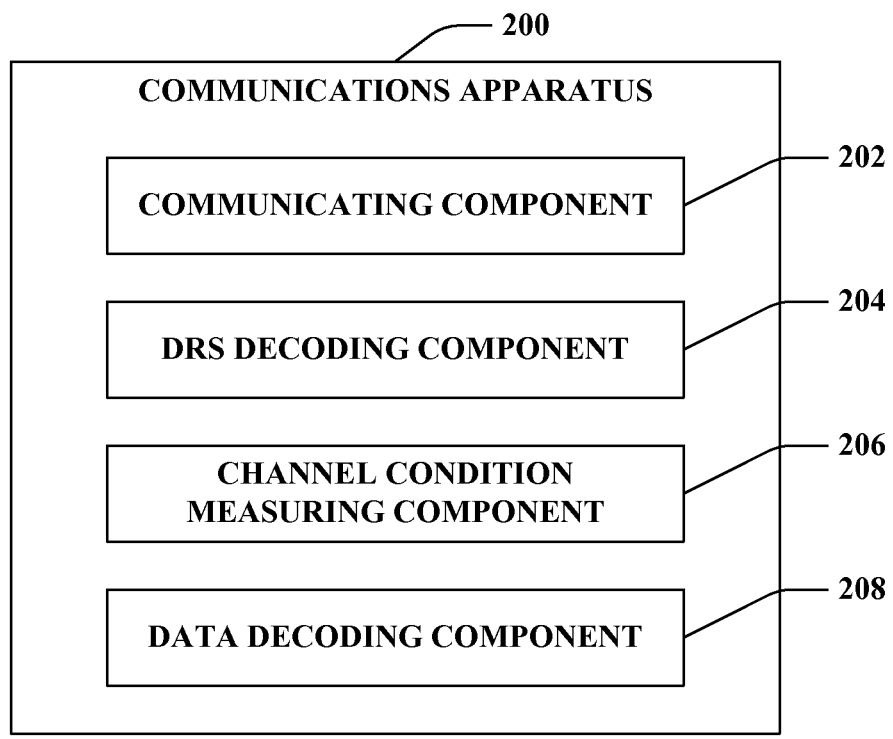
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can receive signals in a wireless network. The communications apparatus 200 can include a communicating component 202 that can transmit signals to and/or receive signals from one or more access points, a DRS decoding component 204 that can interpret a received precoded DRS, a channel condition measuring component 206 that determines radio conditions related to the one or more access points based on the received DRS, and a data decoding component 208 that can decode one or more received data signals based on the precoded DRS.

According to an example, communicating component 202 can receive a DRS from one or more access points or other devices (not shown). As described, the DRS can be specific to communications apparatus 200 and can be precoded. DRS decoding component 204 can determine one or more parameters associated with the DRS. In one example, DRS decoding component 204 can perform a channel estimation based on the precoded DRS. In addition, for example, channel condition measuring component 206 can determine radio conditions related to the DRS by measuring the DRS (e.g., during channel estimation or otherwise). For example, channel condition measuring component 206 can determine a signal-to-noise ratio (SNR) related to the DRS and/or the like. Channel condition measuring component 206 can transmit one or more feedback parameters related to the channel conditions (e.g., CQI) to the one or more access points or other devices using communicating component 202.

After receiving the DRS, for example, communicating component 202 can receive further signals from the one or more access points or other devices, such as one or more data signals. In an example, the data signals can be additionally accompanied by one or more DRSs. The one or more data signals (and/or DRSs) can be precoded using the same precoder, for example, and thus data decoding component 208, for example, estimates a channel of the data signals to decode the data signals based on the previous DRS or the DRS accompanying the data signals. Moreover, for example, where communicating component 202 receives multiple data signals with corresponding DRSs following the initial DRS, DRS decoding component 204 can perform channel estimate averaging over the multiple DRSs that utilize the same precoder. In another example, data decoding component 208 can additionally or alternatively perform channel estimate averaging over the multiple data signals. In any case, this can provide improved channel estimation of the multiple DRSs and/or data signals (e.g., and/or of subsequently received data signals precoded with the same precoder), as described. It is to be appreciated that data signals following a DRS transmission can utilize the same precoder.

Figure 3:
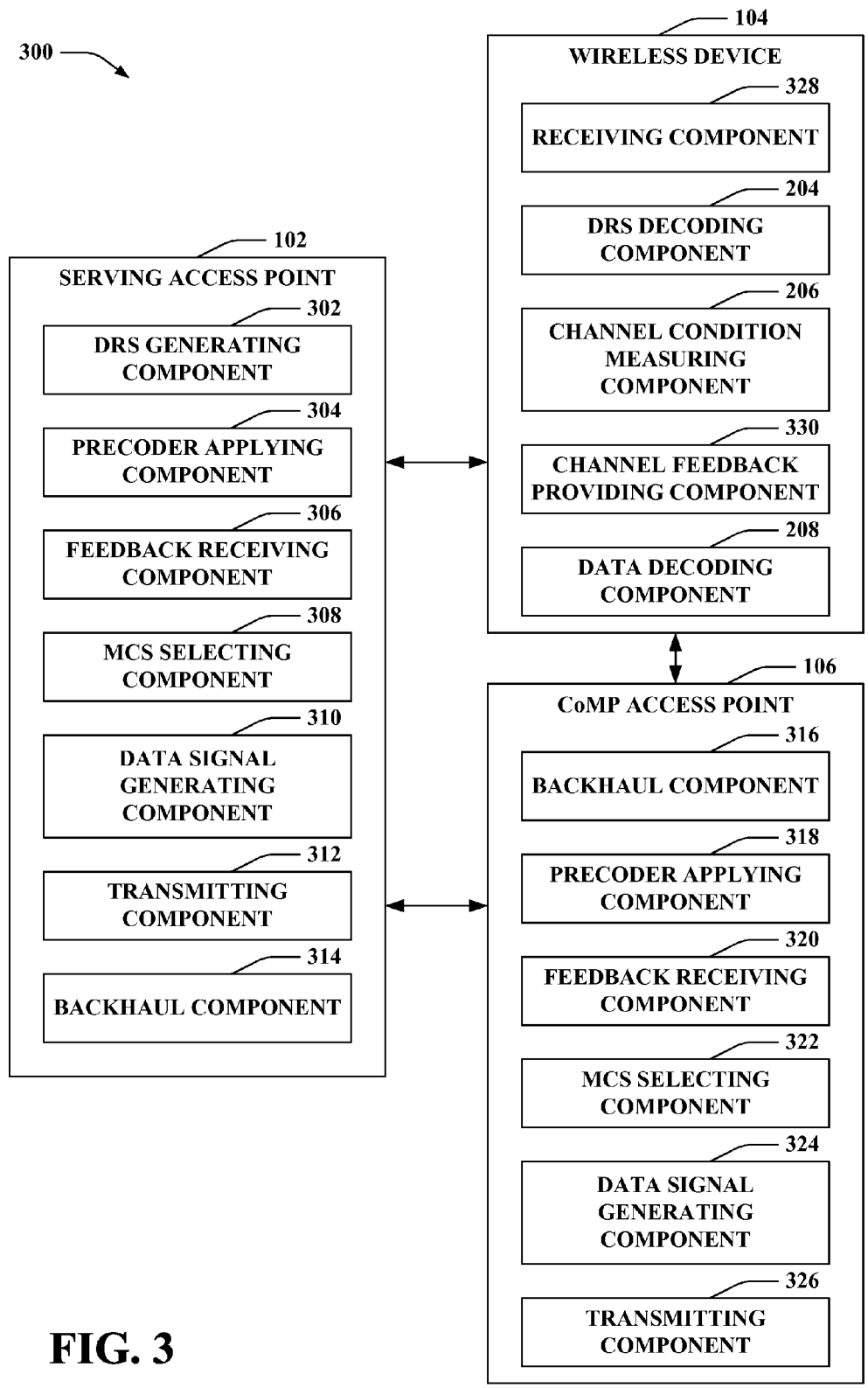
FIG. 3 illustrates an example wireless communication system for precoding dedicated reference signals (DRS) and subsequent data signals.

Now referring to FIG. 3, illustrated is a wireless communications system 300 that facilitates communicating data to a wireless device based at least in part on received feedback parameters. System 300 includes a serving access point 102 that provides one or more wireless devices, such as wireless device 104, with access to a core network (not shown). Moreover, serving access point 102 can communicate with the wireless device 104 over one or more carriers. In addition, CoMP access point 106 can provide CoMP transmissions of serving access point 102 communications to wireless device 104, which it can receive from serving access point 102 over a backhaul link or otherwise. Serving access point 102 and CoMP access point 106 can each be a macrocell access point, femtocell access point, picocell access point, mobile base station, a portion thereof, and/or substantially any device that provides wireless network access. In addition, for example, wireless device 104 can be a UE, modem (or other tethered device), a portion thereof, and/or substantially any device that receives access to a wireless network.

Serving access point 102 comprises a DRS generating component 302 that creates DRS for transmitting to a given wireless device, a precoder applying component 304 that precodes the DRS according to a selected precoder, and a feedback receiving component 306 that obtains feedback from the wireless device relating to the DRS. Serving access point 102 also comprises a MCS selecting component 308 that can determine an MCS to apply to one or more signals for transmission to the wireless device based at least in part on the feedback, a data signal generating component 310 that creates one or more signals comprising data to communicate to the wireless device, a transmitting component 312 that transmits data signals and/or DRSs to the wireless device, and a backhaul component 314 that communicates with one or more CoMP access points to provide signals thereto for communicating in a wireless network.

CoMP access point 106 comprises a backhaul component 316 that obtains communications from a serving access point, a precoder applying component 318 that precodes one or more signals according to a received precoder or related PMI, and a feedback receiving component 320 that determines feedback related to one or more signals transmitted to a wireless device. CoMP access point also comprises a MCS selecting component 322 that obtains or determines a MCS to apply to one or more signals for transmission to the wireless device, a data signal generating component 324 that creates one or more data signals for transmitting to a wireless device, and a transmitting component 326 that transmits data signals and/or DRSs to the wireless device.

Wireless device 104 comprises a receiving component 328 that obtains one or more DRSs or data signals from one or more access points (e.g., in CoMP communications), a DRS decoding component 204 that can interpret the one or more DRSs, and a channel condition measuring component 206 that determines radio conditions related to the DRSs. Wireless device 104 additionally comprises a channel feedback providing component 330 that determines a CQI or other feedback related to the radio conditions and transmits the feedback to one or more access points and a data decoding component 208 that decodes one or more data signals based at least in part on a preceded DRS.

According to an example, serving access point 102 can provide wireless device 104 with access to a wireless network (not shown). In this regard, for example, serving access point 102 can transmit one or more reference signals, such as a CRS, which wireless device 104 can utilize to establish connection with serving access point 102. In addition, for example, DRS generating component 302 can create a DRS specific to wireless device 104, and precoder applying component 304 can precode the DRS according to one or more precoders. For example, precoder applying component 304 selects the precoder from a set of precoders based at least in part on a sequence or pattern, a random sequence, pseudo-random sequence (e.g., based on one or more aspects of wireless device 104, such as an identifier), and/or the like. Furthermore, for example, the set of precoders can be hard-coded in serving access point 102, received in a configuration or network specification, received from one or more network components or wireless devices, and/or the like. Transmitting component 312 can communicate the DRS to wireless device 104. In addition, for example, backhaul component 314 can communicate the DRS, or related parameters, to CoMP access point 106. Thus, backhaul component 316 can obtain the DRS, precoder applying component 318 can precode the DRS according to a selected precoder (or a received precoder or related PMI, or other indicator from serving access point 102), and transmitting component 326 can transmit the DRS to wireless device 104 as well to provide CoMP functionality.

Receiving component 328 can obtain the DRSs from serving access point 102 and/or CoMP access point 106 (and/or additional CoMP access points, for example). DRS decoding component 204 can decode and interpret the DRS, in one example. In addition, channel condition measuring component 206 can determine radio conditions related to the DRS received from serving access point 102 and/or CoMP access point 106. As described, for example, this can be based at least in part on performing a channel estimation of the precoded DRS. Channel condition measuring component 206 can determine a SNR or other metric related to the DRS and/or a channel over which the DRS is received. In addition, channel feedback providing component 330 can determine a CQI or other feedback metric related to the radio conditions. Channel feedback providing component 330 can transmit the feedback to the serving access point 102. This can include transmitting the CQI over PUCCH of serving access point 102 or similar control data resources, as described.

In this example, feedback receiving component 306 can obtain the channel feedback from wireless device 104 (e.g., over the control data resources). For example, MCS selecting component 308 can determine an MCS to apply for generating one or more data signals for transmitting to wireless device 104. In one example, the MCS can relate to transmitting a single data transmission or a burst of multiple data transmissions in one or more data signals based on the feedback. Moreover, data signal generating component 310, for example, can create one or more data signals for wireless device 104 using the MCS to puncture data transmissions in the data signals, and transmitting component 312 can communicate the one or more data signals to wireless device 104. In addition, as described, precoder applying component 304 can precode the one or more data signals using the same precoder as used for the previous DRS. Moreover, for example, DRS generating component 302 can generate a DRS for transmitting with the one or more data signals, and precoder applying component 304 can precode the DRS as well. Transmitting component 312, as described, can transmit the one or more precoded data signals and/or DRSs to wireless device 104.

In addition, for example, backhaul component 314 can communicate the feedback to CoMP access point 106. Backhaul component 316 can obtain the communication including the feedback, and feedback receiving component 320 can interpret the feedback. In another example, feedback receiving component 320 can decode the feedback transmitted by wireless device 104 (e.g., over control data resources related to serving access point 102). MCS selecting component 322 can similarly determine an MCS for subsequent data transmissions based at least in part on the feedback. In one example, it is to be appreciated that MCS selecting component 308 and MCS selecting component 322 can determine substantially similar MCSs for the data based at least in part on the feedback parameters. Moreover, for example, backhaul component 314 can communicate the one or more data transmissions to CoMP access point 106 for transmitting to wireless device 104.

Additionally, backhaul component 316 can receive the data transmissions from serving access point 102, and data signal generating component 324 can create one or more data signals for the one or more data transmissions based at least in part on the MCS, as described. In addition, for example, precoder applying component 318 can precode the data signals according to the same precoder as used by precoder applying component 318 for the previous DRS. In one example, the precoder or related PMI or other indication can be received with the data transmissions at backhaul component 316, as a separate communication, and/or the like. In addition, transmitting component 326 can communicate the one or more data signals to wireless device 104. Moreover, where serving access point 102 also transmits DRS with the data signals, it can similarly provide the DRS to CoMP access point 106 using backhaul components 314 and 316 as well for transmission (and/or precoding) thereof. In this regard, CoMP access point 106 can transmit substantially the same data signals and/or related DRS as serving access point 102.

In this example, receiving component 328 can obtain the one or more data signals from both serving access point 102 and CoMP access point 106 in CoMP communications. Data decoding component 208, as described, can decode the data at least in part according to the previously received precoded DRS or a precoded DRS received with the data signals. In any case, the previously received precoded DRS, the precoded DRS received with the data signals, and the data signals are precoded using the same precoder. Moreover, as described, serving access point 102 can transmit a burst of multiple data transmissions in the data signals, which can all have the same precoding, and data decoding component 208 can decode the burst using the same precoder. In one example, DRS decoding component 204 can perform channel estimate averaging over DRSs related to the multiple data signals to improve channel estimation of the data signals (or subsequent similarly precoded data signals) by data decoding component 208 and/or of the DRSs (or subsequent similarly precoded DRSs) by DRS decoding component 204.

Moreover, for example, upon receiving feedback from wireless device 104 at feedback receiving component 306, precoder applying component 304 can cycle to a next precoder. In one example, this can be based at least in part on the feedback. Where precoder applying component 304 cycles to a disparate precoder, DRS generating component 302 can create a DRS related to wireless device 104, and precoder applying component 304 can precode the DRS using the disparate precoder (e.g., selected according to a sequence, pattern, random sequence, etc., as described). In this example, transmitting component 312 can transmit the signals, and backhaul component 314 can communicate the signals or related information to CoMP access point 106 for CoMP transmission to wireless device 104. In this example, transmitting component 312 does not transmit data signals with the DRS so it can receive feedback regarding the DRS, as described above. Depending on the feedback, for example, data signal generating component 310 can create one or more data signals for transmission using the same precoder (e.g., this can include MCS selecting component 308 determining a MCS to utilize based on the feedback), as described.

In another example, serving access point 102 can communicate with wireless device 104 using MIMO technology where it can provide multiple resource allocations to wireless device 104 in a given time period. In this example, DRS generating component 302 can create different DRSs related to each resource allocation for wireless device 104. In addition, for example, CoMP access point 106 can support at least a portion of the resource allocations to provide CoMP communications to wireless device 104, and thus can be employed to additionally transmit corresponding DRSs, as described. It is to be appreciated, for example, that serving access point 102 can utilize disparate CoMP access points for one or more of the resource allocations. Upon receiving multiple DRSs, DRS decoding component 204 can interpret the DRSs, and channel condition measuring component 206 can determine radio conditions related to each DRS, as described above. Thus, for example, channel feedback providing component 330 can transmit feedback parameters (e.g., CQI and/or the like) for each DRS to serving access point 102.

In this example, feedback receiving component 306 can obtain the feedback, and MCS selecting component 308 can determine MCS for transmitting data according to each DRS, as described. In addition, for example, backhaul component 314 can communicate the feedback corresponding to each given DRS to the related CoMP access points (e.g., CoMP access point 106). In addition, for example, data signal generating component 310 can create data signals for transmission over the multiple resource allocations, and precoder applying component 304 can precode the data signals according to the corresponding DRSs, as described. Additionally, as described, transmitting component 312 can communicate the data signals (and/or related DRSs) to wireless device 104, and backhaul component 314 can provide the data signals (and/or related DRSs) to CoMP access points.

Figure 4:
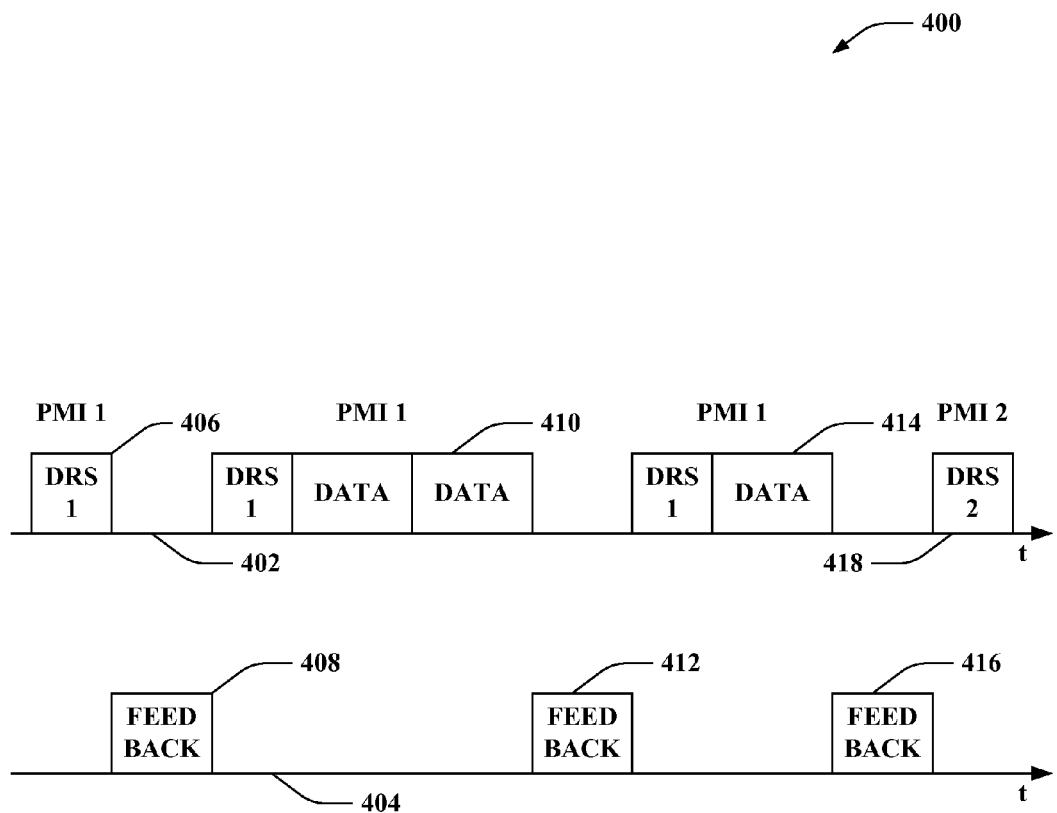
FIG. 4 illustrates example timelines for communicating DRSs, data signals, and related feedback.

Turning to FIG. 4, illustrated are example timelines 400 related to adaptively transmitting DRS and data signals according to aspects described herein. In an example, timeline 402 can relate to a serving and/or CoMP access point, and timeline 404 can correspond to a wireless device. Thus, for example, at 406, the serving and/or CoMP access point can transmit DRS 1, which is precoded using PMI 1. The wireless device can measure channel conditions related to the DRS (e.g., when interpreting the DRS, as described), and can provide feedback 408 to a serving access point. As described, in an example, the serving access point can provide the feedback to one or more CoMP access points as well. The access point can transmit another DRS and related data signals at 410, which can be precoded with the same precoder (PMI 1), to the wireless device. As described, in an example, the feedback can be utilized in selecting an MCS for the DRS and data 410 to transmit a single data transmission or a burst of multiple data transmissions. In one example, the feedback can also be utilized to determine whether to select a next precoder in a set of precoders.

The access point can keep using the same precoder for transmitting data and/or DRS until an event occurs, in one example. The event can be timer-based, for example, determined based at least in part on the feedback, determined based at least in part on a number of data signals and/or related transmissions, etc. The wireless device can measure the DRS 1 and/or data signals 410 and provide feedback 412 to the access point. Again, the feedback can be at or above a threshold level, and the access point can communicate DRS and data signals 414, which can be precoded using the precoder that corresponds to PMI 1. Again, the wireless device can measure channel quality related to DRS 1 and data 414 and can provide feedback 416 to the access point. Access point can now select another precoder for DRSs related to the wireless device and can transmit DRS 2 418 using PMI 2 as the precoder. Thus, in an example, DRS-only transmission can be utilized to change precoders. Based on subsequent feedback, in an example, the access point can continue using the precoder in communicating with the wireless device or can switch precoders again by transmitting another DRS. As described, the access point can cycle though precoders according to a pattern or sequence, a random sequence, pseudo-random sequence, etc.

Figure 5:
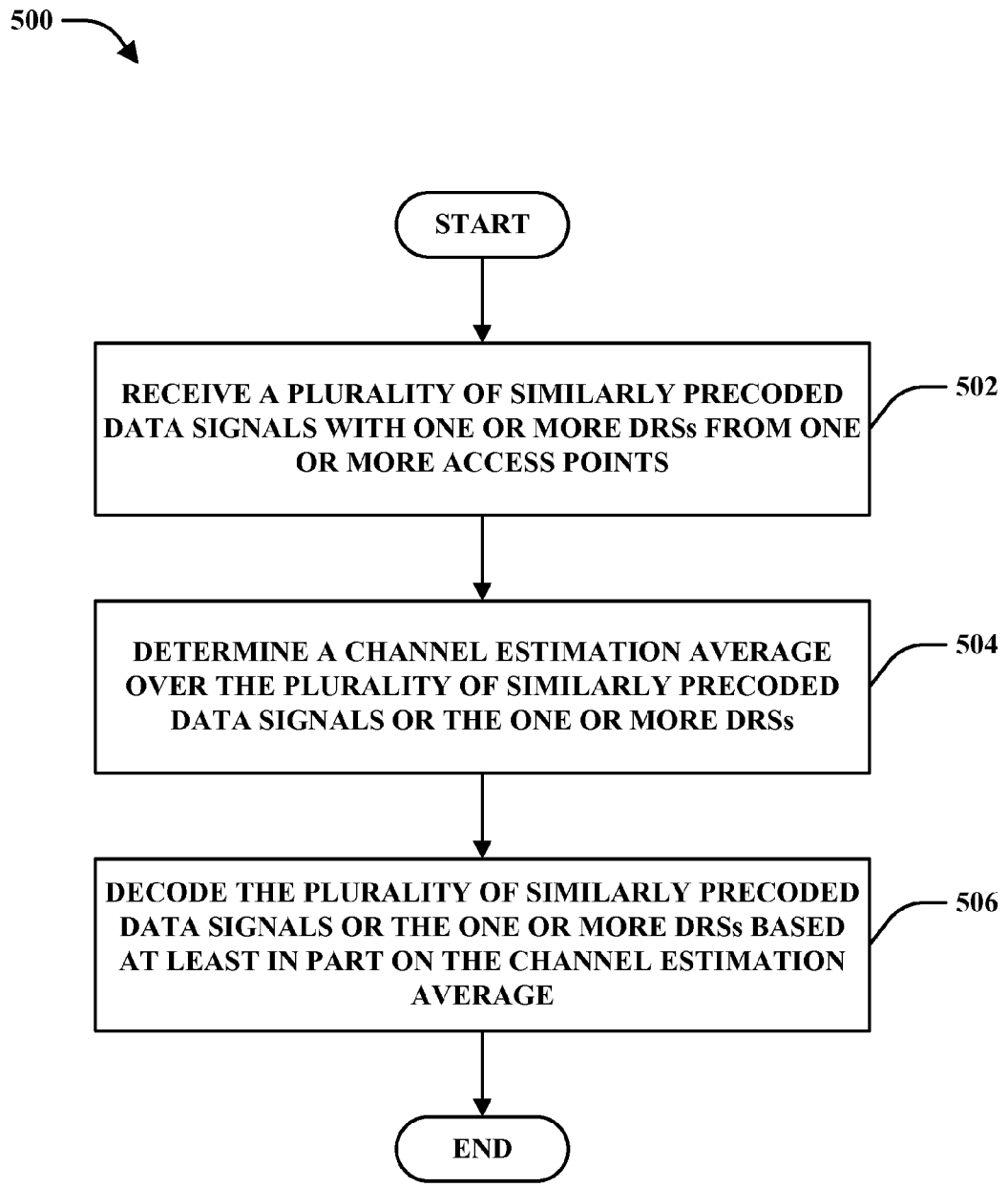
FIG. 5 is a flow diagram of an example methodology that performs channel estimate averaging over a plurality of signals.
Figure 6:
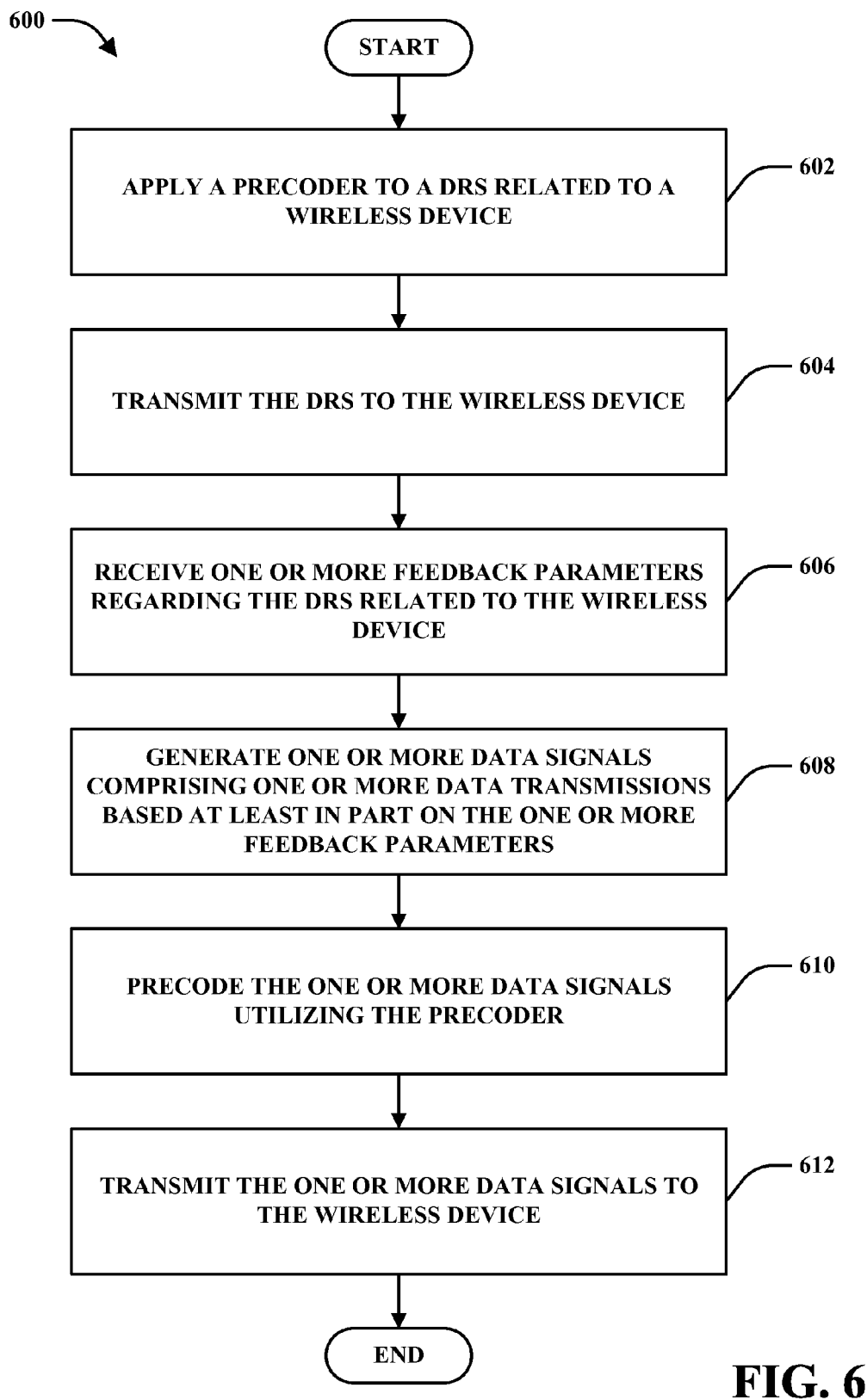
FIG. 6 is a flow diagram of an example methodology that precodes DRSs and related data signals.
Figure 7:
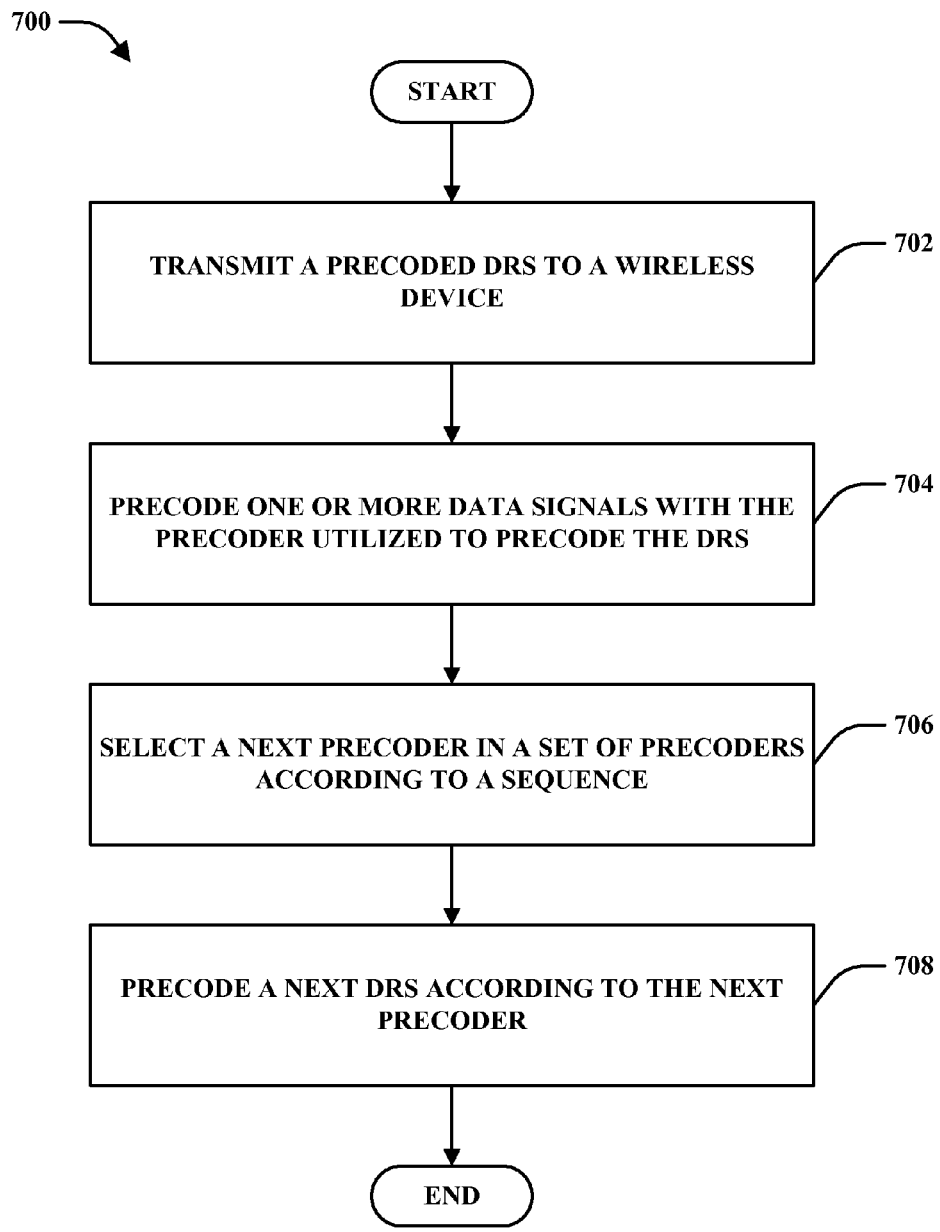
FIG. 7 is a flow diagram of an example methodology that cycles through precoders for precoding DRSs and related data signals.

Referring now to FIGS. 5-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning now to FIG. 5, an example methodology 500 is shown that facilitates decoding signals according to an averaged channel estimate. At 502, a plurality of similarly precoded data signals can be received with one or more DRSs from one or more access points. As described, for example, data signals and DRSs can be precoded with the same precoder. At 504, a channel estimation average can be determined over the plurality of similarly precoded data signals or the one or more DRSs. This can include, for example, combining channel estimations of the similarly precoded data signals and/or DRSs and computing an average thereover. At 506, the plurality of similarly precoded data signals or the one or more DRSs can be decoded based at least in part on the channel estimation average. Thus, the averaging can improve accuracy of subsequent channel estimation of similarly precoded signals, as described.

Referring to FIG. 6, an example methodology 600 that adaptively transmits signals to a wireless device is illustrated. At 602, a precoder can be applied to a DRS related to a wireless device. As described, for example, the precoder can correspond to a selected precoder in a set of precoders (e.g., which can correspond to the wireless device). At 604, the DRS can be transmitted to the wireless device. In an example, the wireless device can compute feedback parameters related to radio conditions of the channel over which the DRS is received. Thus, at 606, one or more feedback parameters regarding the DRS and related to the wireless device can be received. At 608, one or more data signals comprising one or more data transmissions can be generated based at least in part on the one or more feedback parameters. Thus, for example, where feedback indicates radio conditions above a threshold level, data signals can be generated to include a burst of data transmissions. At 610, the one or more data signals can be precoded utilizing the precoder. This facilitates adaptive communication of the data transmissions since the data signals are generated based on the feedback and the same precoder is used for the data signals. At 612, the one or more data signals can be transmitted to the wireless device.

Turning now to FIG. 7 an example methodology 700 is shown that facilitates cycling through precoders in communicating with one or more wireless devices. At 702, a precoded DRS can be transmitted to a wireless device. As described, feedback can be received from the wireless device regarding the precoder used to precode the DRS. At 704, one or more data signals can be precoded with the precoder utilized to precode the DRS. This provides adaptive transmission of signals to the wireless device, as described. At 706, a next precoder in a set of precoders can be selected according to a sequence. As described, for example, the sequence can be a patterned, random, pseudo-random, and/or similar sequence. Moreover, for example, the next precoder can be selected for each data transmission, according to a timer, based on an event (e.g., feedback regarding channel quality), and/or the like, as described. At 708, a next DRS can be precoded according to the next precoder.

It will be appreciated that, in accordance with one or more aspects described herein, inferences can be made regarding determining a precoder or a related sequence, interpreting feedback parameters for selecting an MCS, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
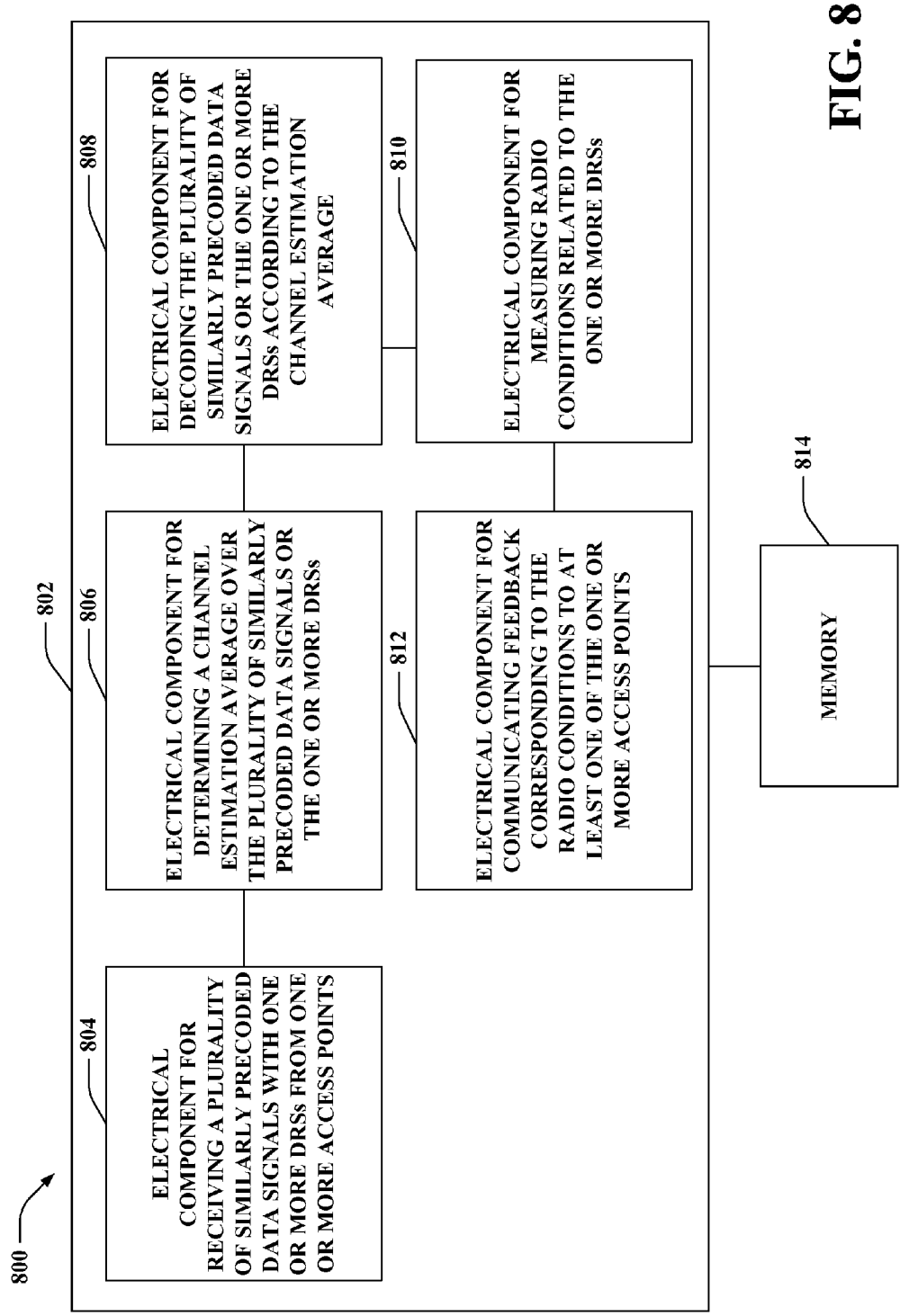
FIG. 8 is a block diagram of an example apparatus that decodes precoded DRSs and related data signals.

With reference to FIG. 8, illustrated is a system 800 that facilitates decoding communications according to a determined precoder. For example, system 800 can reside at least partially within a base station, mobile device, or another device that provides access to a wireless network. It is to be appreciated that system 800 is represented as including functional blocks, which can be functional blocks that represent functions implemented by a processor, or a combination of a processor and fixed or programmable instructions (e.g., software, firmware, etc). System 800 includes a logical grouping 802 of electrical components that can act in conjunction. For instance, logical grouping 802 can include an electrical component for receiving a plurality of similarly precoded data signals with one or more DRSs from one or more access points 804. As described, the data signals and DRSs can be precoded with the same precoder. In addition, for example, logical grouping 802 can comprise an electrical component for determining a channel estimation average over the plurality of similarly precoded data signals or the one or more DRSs 806.

For example, the channel estimation average can improve decoding of the data signals or DRSs (or subsequently received similarly precoded data signals or DRSs). Moreover, logical grouping 802 can include an electrical component for decoding the plurality of similarly precoded data signals or the one or more DRSs according to the channel estimation average 808. Furthermore, as described, logical grouping 802 includes an electrical component for measuring radio conditions related to the one or more DRSs 810, and an electrical component for communicating feedback corresponding to the radio conditions to at least one of the one or more access points 812. In one example, as described, the feedback can be communicated to a serving access point, which can communicate the feedback over a backhaul. Additionally, system 800 can include a memory 814 that retains instructions for executing functions associated with electrical components 804, 806, 808, 810, and 812. While shown as being external to memory 814, it is to be understood that one or more of electrical components 804, 806, 808, 810, and 812 can exist within memory 814.

Figure 9:
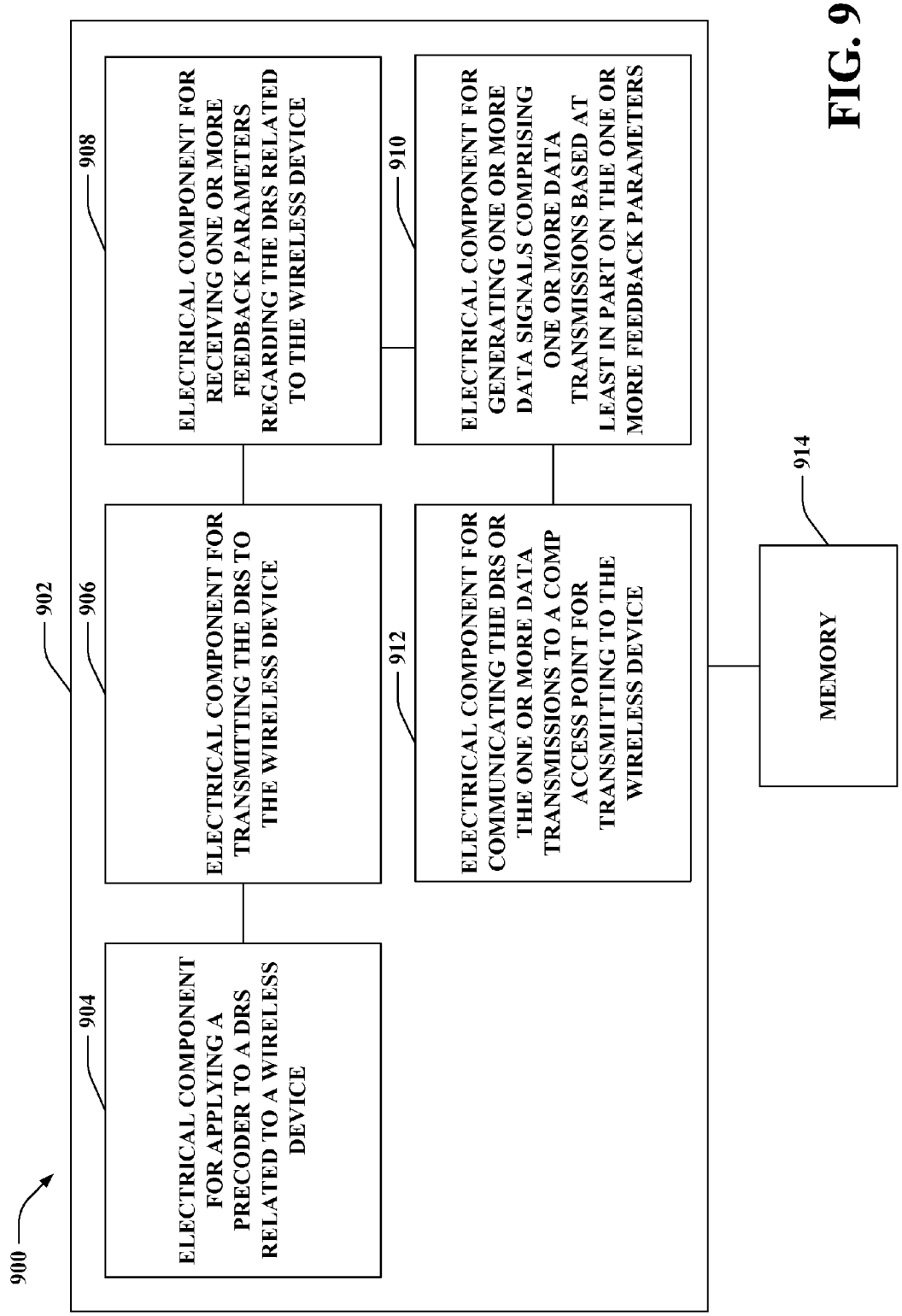
FIG. 9 is a block diagram of an example apparatus that precodes data signals related to a DRS created based on feedback corresponding to the DRS.

With reference to FIG. 9, illustrated is a system 900 that communicates data signals to one or more wireless devices based on feedback related to a DRS. For example, system 900 can reside at least partially within a base station, mobile device, or another device that provides access to a wireless network. It is to be appreciated that system 900 is represented as including functional blocks, which can be functional blocks that represent functions implemented by a processor a combination of a processor and fixed or programmable instructions (e.g., software, firmware, etc.). System 900 includes a logical grouping 902 of electrical components that can act in conjunction. For instance, logical grouping 902 can include an electrical component for applying a precoder to a DRS related to a wireless device 904. As described, the precoder can be selected based at least in part on a set or sequence of precoders, which can be patterned, random, pseudo-random, etc. Further, logical grouping 902 can comprise an electrical component for transmitting the DRS to the wireless device 906. Moreover, logical grouping 902 can include an electrical component for receiving one or more feedback parameters regarding the DRS related to the wireless device 908.

For example, the feedback parameters can include a CQI related to radio conditions of receiving the DRS. In this regard, data signals can be generated to include a single data transmission or burst of multiple data transmissions depending on the feedback. Thus, logical grouping 902 includes an electrical component for generating one or more data signals comprising one or more data transmissions based at least in part on the one or more feedback parameters 910. Moreover, as described, the one or more data signals can be precoded using the same precoder (e.g., by electrical component 904) and transmitted (e.g., by electrical component 906) to the wireless device. In addition, logical grouping 902 includes an electrical component for communicating the DRS or the one or more data transmissions to a CoMP access point for transmitting to the wireless device 912. Thus, additional access points can transmit the DRS and/or data signals to the wireless device to provide CoMP communications, as described herein. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
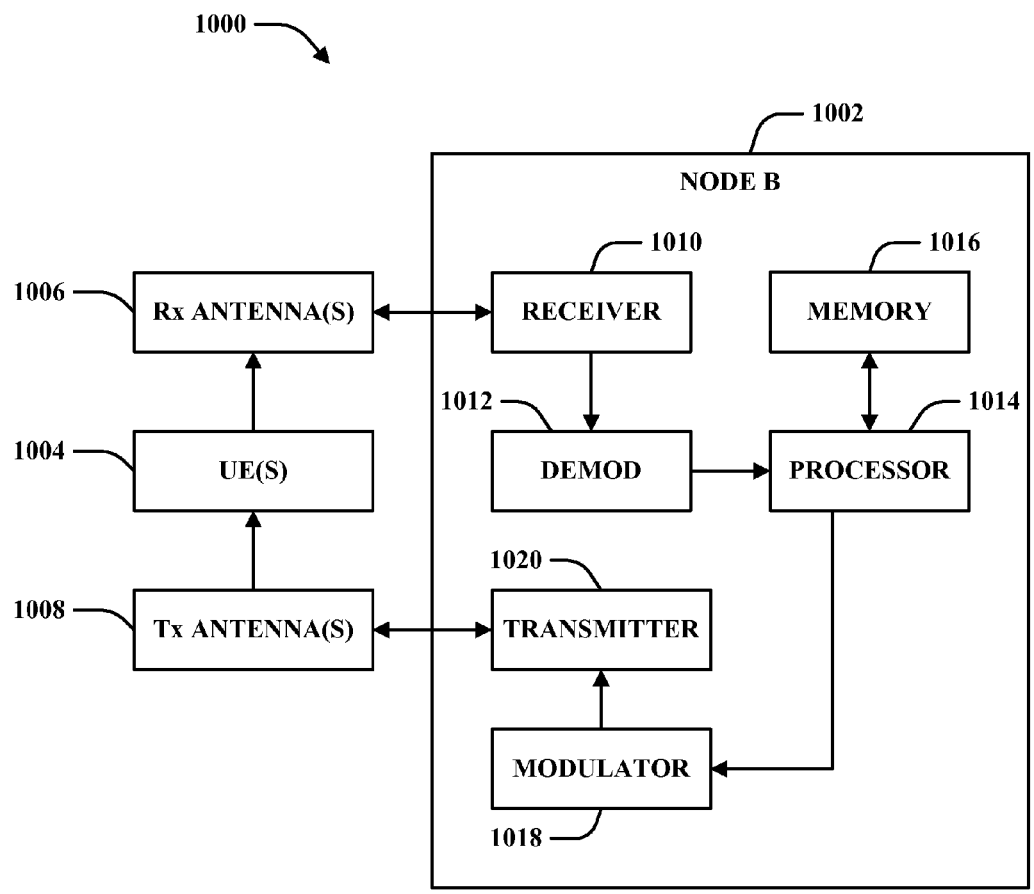
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or Node B 1002. As illustrated, Node B 1002 can receive signal(s) from one or more UEs 1004 via one or more receive (Rx) antennas 1006 and transmit to the one or more UEs 1004 via one or more transmit (Tx) antennas 1008. Additionally, Node B 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, Node B 1002 can employ processor 1014 to perform methodologies 500, 600, 700, and/or other similar and appropriate methodologies. Node B 1002 can also include a modulator 1018 that can multiplex a signal for transmission by a transmitter 1020 through transmit antenna(s) 1008.

Figure 11:
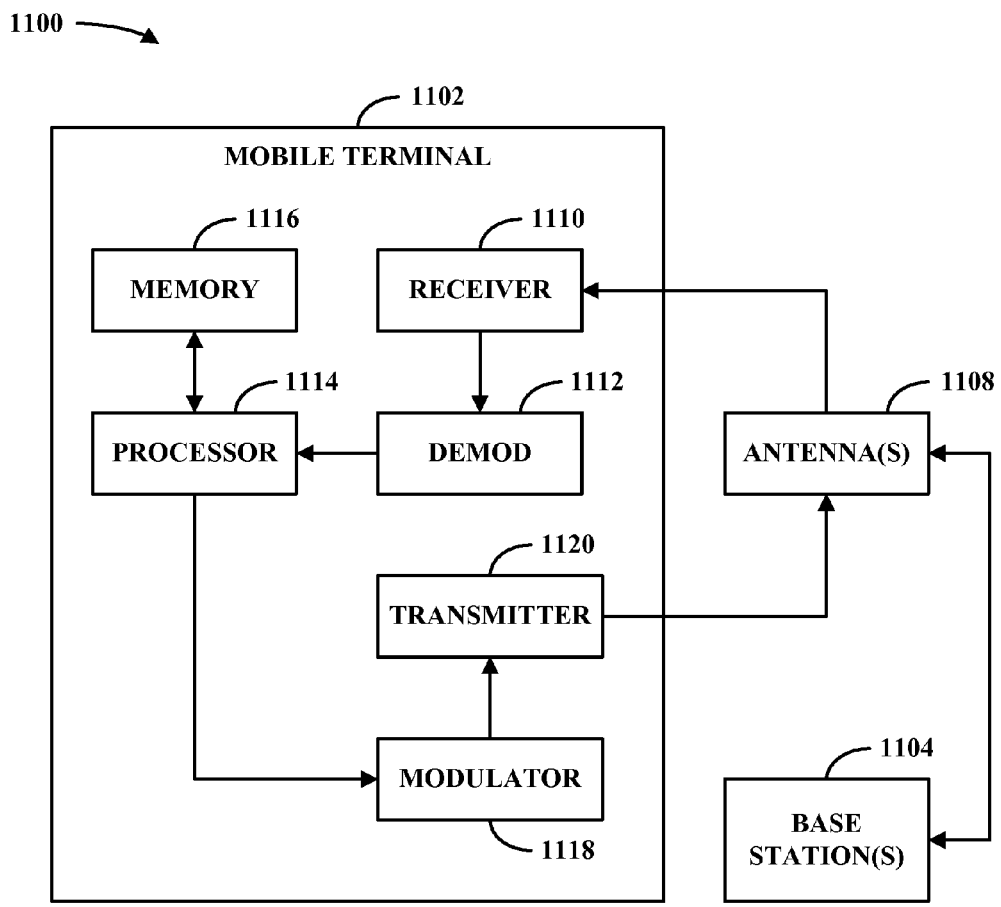

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 500, 600, 700, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
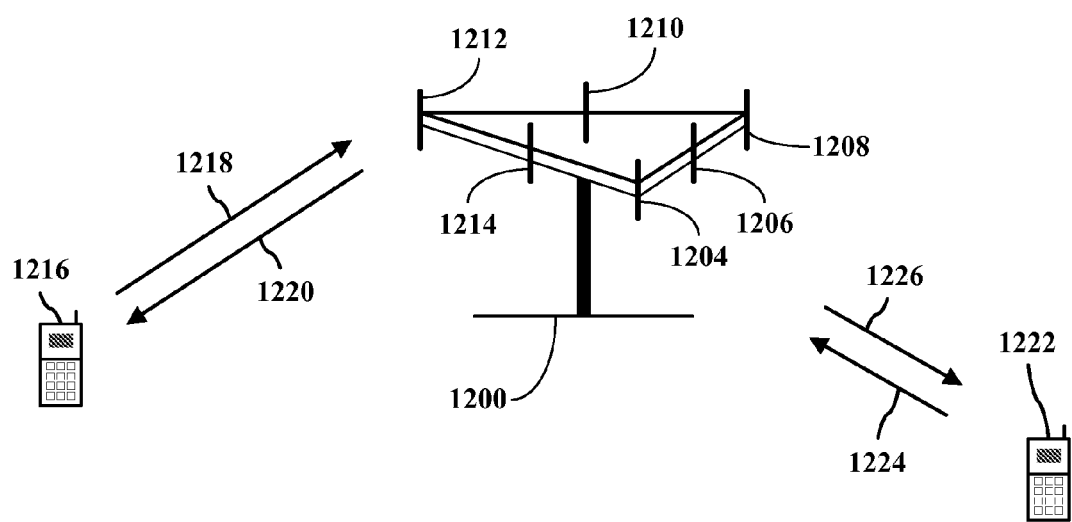
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, a Node B, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
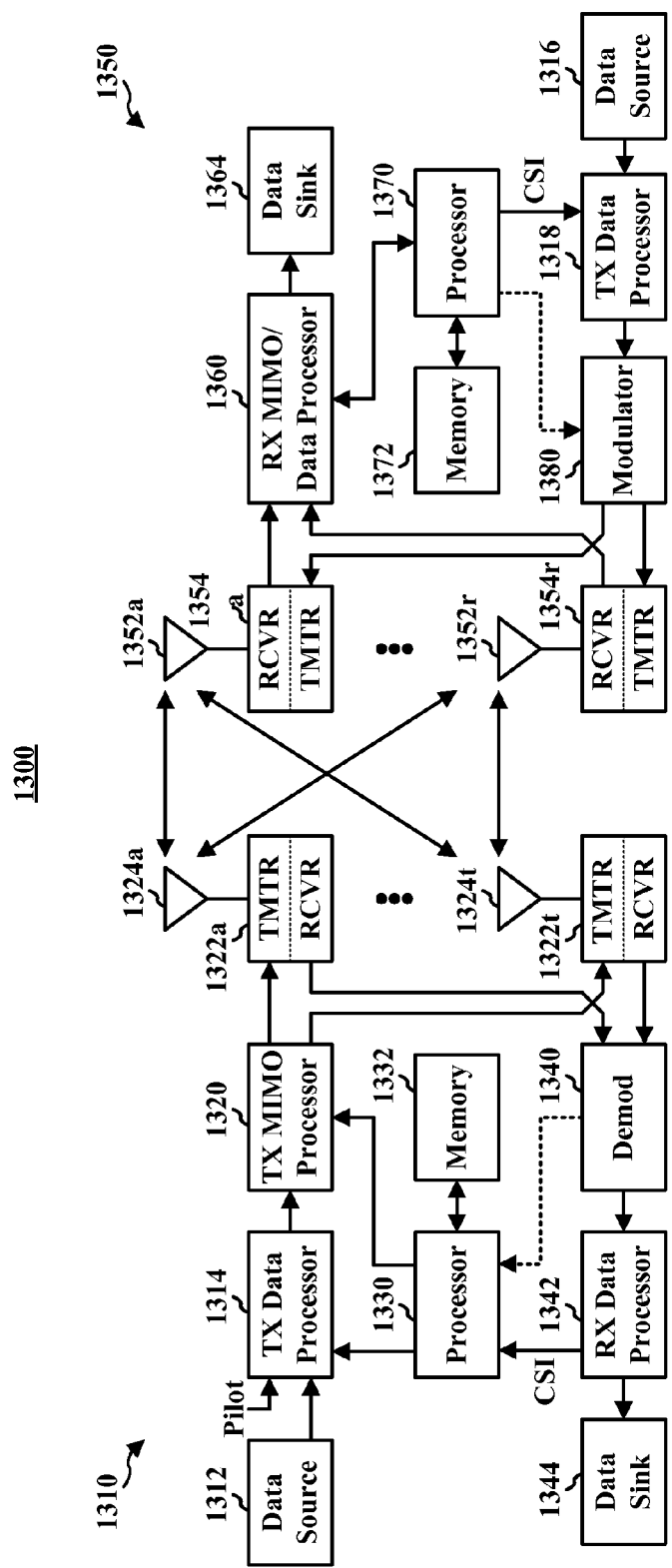
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX MIMO processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and up-convert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and down-convert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX MIMO/data processor 1360 can then process each symbol stream at least in part by demodulating, deinterleaving, and decoding each detected symbol stream to recover traffic data for a corresponding data stream. Thus, the processing by RX MIMO/data processor 1360 can be complementary to that performed by TX MIMO processor 1320 and TX data processor 1318 at transmitter system 1310. RX MIMO/data processor 1360 can additionally provide processed symbol streams to a data sink 1364.

In accordance with one aspect, the channel response estimate generated by RX MIMO/data processor 1360 can be used to perform space/time processing at the receiver, adjust power levels, change modulation rates or schemes, and/or other appropriate actions. Additionally, RX MIMO/data processor 1360 can further estimate channel characteristics such as, for example, signal-to-noise-and-interference ratios (SNRs) of the detected symbol streams. RX MIMO/data processor 1360 can then provide estimated channel characteristics to a processor 1370. In one example, RX MIMO/data processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method performed by a wireless device, comprising:
receiving, from a plurality of access points, dedicated reference signals (DRSs) which are precoded using a first precoder;
receiving a DRS-only transmission from the plurality of access points, the DRS-only transmission comprising a plurality of DRSs transmitted without data signals, wherein the DRSs of the DRS-only transmission are precoded using a second precoder and the DRS-only transmission indicates a change in precoders for at least one of the plurality of access points;
determining a channel estimation average for the plurality of DRSs;
receiving subsequent data signals which are precoded using the second precoder from the plurality of access points; and
decoding the subsequent data signals based at least in part on the channel estimation average.

2. The method of claim 1, further comprising determining at least one feedback parameter based at least in part on radio conditions related to the plurality of DRSs.

3. The method of claim 2, further comprising transmitting the at least one feedback parameter to a serving access point, wherein the plurality of access points includes the serving access point.

4. A wireless communications apparatus, comprising:
at least one processor configured to cause the wireless communications apparatus to:
obtain from a plurality of access points dedicated reference signals (DRSs) which are precoded using a first precoder;
obtain a DRS-only transmission from the plurality of access points, the DRS-only transmission comprising a plurality of DRSs obtained without corresponding data signals, wherein the DRSs of the DRS-only transmission are precoded using a second precoder and the DRS-only transmission indicates a change in precoders for at least one of the plurality of access points;
estimate a channel for each of the plurality of DRSs; and
average the channel as estimated for each of the plurality of DRSs to improve decoding of subsequent data signals which are precoded using the second precoder; and
a memory coupled to the at least one processor.

5. The wireless communications apparatus of claim 4, wherein the at least one processor is further configured to cause the wireless communications apparatus to measure radio conditions related to the plurality of DRSs and transmit at least one feedback parameter to at least one of the plurality of access points based at least in part on the radio conditions.

6. The wireless communications apparatus of claim 4, wherein the at least one processor is further configured to cause the wireless communications apparatus to receive at least one subsequent data signal and estimate a disparate channel of the at least one subsequent data signal based at least in part on the average of the channel as estimated for each of the plurality of DRSs which are precoded using the second precoder.

7. A wireless communications apparatus, comprising:
means for receiving from a plurality of access points dedicated reference signals (DRSs) which are precoded using a first precoder;
means for receiving a DRS-only transmission from the plurality of access points, the DRS-only transmission comprising a plurality of DRSs without corresponding data signals, wherein the DRSs of the DRS-only transmission are precoded using a second precoder and the DRS-only transmission indicates a change in precoders for at least one of the plurality of access points;
means for determining a channel estimation average for the plurality of DRSs;
means for receiving subsequent data signals which are precoded using the second precoder from the plurality of access points; and
means for decoding the subsequent data signals based at least in part on the channel estimation average.

8. The wireless communications apparatus of claim 7, further comprising:
means for measuring radio conditions related to the plurality of DRSs; and
means for communicating feedback corresponding to the radio conditions to at least one of the plurality of access points.

9. A computer program product, comprising:
a non-transitory computer-readable medium comprising:
code for causing at least one computer to obtain dedicated reference signals (DRSs) from a plurality of access points which are precoded using a first precoder;
code for causing the at least one computer to obtain a DRS-only transmission from the plurality of access points, the DRS-only transmission comprising a plurality of DRSs without corresponding data signals, wherein the DRSs of the DRS-only transmission are precoded using a second precoder and the DRS-only transmission indicates a change in precoders for at least one of the plurality of access points;
code for causing the at least one computer to estimate a channel for each of the plurality of DRSs; and
code for causing the at least one computer to average the channel as estimated for each of the plurality of DRSs to improve decoding of subsequent data signals which are precoded using the second precoder.

10. The computer program product of claim 9, wherein the computer-readable medium further comprises code for causing the at least one computer to measure radio conditions related to the plurality of DRSs and transmit at least one feedback parameter to at least one of the plurality of access points based at least in part on the radio conditions.

11. The computer program product of claim 9, wherein the computer-readable medium further comprises code for causing the at least one computer to receive at least one subsequent data signal and estimate a disparate channel of the at least one subsequent data signal based at least in part on the average of the channel as estimated for each of the plurality of DRSs which are precoded using the second precoder.

12. A wireless communications apparatus, comprising:
a receiver configured to receive a dedicated reference signal (DRS)-only transmission comprising a plurality of DRSs without corresponding data signals from a plurality of access points, wherein the DRSs of the DRS-only transmission are precoded using a same precoder and the DRS-only transmission indicates a change in precoders for at least one of the plurality of access points; and
at least one processor coupled to the receiver, wherein the at least one processor is configured to average channel estimates for the plurality of DRSs to facilitate decoding of subsequent data signals which are precoded using the same precoder.

13. The wireless communications apparatus of claim 12, further comprising:
a data decoder that decodes the subsequent data signals which are precoded using the same precoder based at least in part on the channel estimation as averaged.

14. The wireless communications apparatus of claim 12, wherein the at least one processor is further configured to determine radio conditions related to the plurality of DRSs, the wireless communications apparatus further comprising:
a transmitter configured to communicate feedback corresponding to the radio conditions to at least one of the plurality of access points.

15. The wireless communications apparatus of claim 13, wherein the receiver is configured to receive a plurality of data transmissions in at least one subsequent data signal from the plurality of access points, and the data decoder is configured to estimate a channel of the at least one subsequent data signal based at least in part on the channel estimation as averaged.

16. A method, comprising:
applying a precoder to a dedicated reference signal (DRS) related to a wireless device;
transmitting a DRS-only transmission comprising the DRS without corresponding data signals to the wireless device, the DRS-only transmission indicating a change in precoders;
receiving at least one feedback parameter regarding the DRS related to the wireless device;
generating at least one data signal comprising at least one data transmission based at least in part on the feedback parameter;
precoding the at least one data signal utilizing the precoder; and
transmitting the at least one data signal to the wireless device.

17. The method of claim 16, further comprising communicating the DRS or the at least one data transmission to a coordinated multiple point (CoMP) access point for transmitting to the wireless device.

18. The method of claim 17, further comprising communicating the at least one feedback parameter to the CoMP access point.

19. The method of claim 17, further comprising communicating the precoder or a related precoding matrix indicator to the CoMP access point.

20. The method of claim 16, further comprising receiving at least one disparate feedback parameter from the wireless device regarding the at least one data signal.

21. The method of claim 16, further comprising:
selecting a next precoder in a set of precoders;
applying the next precoder to a disparate DRS related to the wireless device; and
transmitting the disparate DRS to the wireless device.

22. The method of claim 21, wherein the selecting the next precoder includes selecting the next precoder from a sequence related to the set of precoders, wherein the sequence is a patterned sequence, a random sequence, or a pseudo-random sequence.

23. The method of claim 16, further comprising applying a modulation and coding scheme to the at least one data transmission to create the at least one data signal based at least in part on the at least one feedback parameter.

24. The method of claim 16, wherein the receiving the at least one feedback parameter includes receiving the at least one feedback parameter from a serving access point.

25. The method of claim 24, further comprising receiving the DRS and the at least one data transmission from the serving access point.

26. The method of claim 18, further comprising:
applying a disparate precoder to a disparate DRS related to the wireless device over a disparate set of resources in a multiple-input multiple-output configuration;
transmitting the disparate DRS to the wireless device;
receiving at least one disparate feedback parameter regarding the disparate DRS related to the wireless device;
generating at least one disparate data signal comprising at least one disparate data transmission based at least in part on the at least one disparate feedback parameter; and
precoding the at least one disparate data signal utilizing the disparate precoder;
transmitting the at least one disparate data signal to the wireless device.

27. A wireless communications apparatus, comprising:
at least one processor configured to cause the wireless communications apparatus to:
utilize a precoder to precode a dedicated reference signal (DRS) specific to a wireless device;
transmit a DRS-only transmission comprising the DRS without corresponding data signals to the wireless device, the DRS-only transmission indicating a change in precoders;
obtain at least one feedback parameter based at least in part on receiving the DRS at the wireless device;
create at least one data signal comprising at least one data transmission based at least in part on the at least one feedback parameter;
precode the at least one data signal according to the precoder; and
transmit the at least one data signal to the wireless device; and
a memory coupled to the at least one processor.

28. The wireless communications apparatus of claim 27, wherein the at least one processor is further configured to cause the wireless communications apparatus to communicate the DRS or the at least one data transmission to a coordinated multiple point (CoMP) access point.

29. The wireless communications apparatus of claim 28, wherein the at least one processor is further configured to cause the wireless communications apparatus to communicate the at least one feedback parameter to the CoMP access point.

30. The wireless communications apparatus of claim 27, wherein the at least one processor is further configured to cause the wireless communications apparatus to communicate the precoder or a related precoding matrix indicator to the CoMP access point.

31. The wireless communications apparatus of claim 27, wherein the at least one processor is further configured to cause the wireless communications apparatus to:
  determine a next precoder in a set of precoders, wherein the precoder is in the set of precoders;
  utilize the next precoder to precode a disparate DRS related to the wireless device; and
  communicate the disparate DRS to the wireless device.

32. The wireless communications apparatus of claim 31, wherein the at least one processor is further configured to cause the wireless communications apparatus to determine the next precoder in the set of precoders based at least in part on a patterned, random, or pseudo-random sequence.

33. The wireless communications apparatus of claim 27, wherein the at least one processor is further configured to cause the wireless communications apparatus to apply a modulation and coding scheme to the at least one data transmission based at least in part on the at least one feedback parameter to generate the at least one data signal.

34. The wireless communications apparatus of claim 27, wherein the at least one processor is further configured to cause the wireless communications apparatus to receive the at least one feedback parameter from a serving access point.

35. A wireless communications apparatus, comprising:
  means for applying a precoder to a dedicated reference signal (DRS) related to a wireless device;
  means for transmitting a DRS-only transmission comprising the DRS without corresponding data signals to the wireless device, the DRS-only transmission indicating a change in precoders;
  means for receiving at least one feedback parameter regarding the DRS related to the wireless device; and
  means for generating at least one data signal comprising at least one data transmission based at least in part on the at least one feedback parameter, wherein the means for applying the precoder applies the precoder to the at least one data signal, and the means for transmitting transmits the at least one data signal to the wireless device.

36. The wireless communications apparatus of claim 35, further comprising means for communicating the DRS or the at least one data transmission to a coordinated multiple point (CoMP) access point for transmitting to the wireless device.

37. The wireless communications apparatus of claim 36, wherein the means for communicating communicates the at least one feedback parameter to the CoMP access point.

38. The wireless communications apparatus of claim 36, wherein the means for communicating communicates the precoder or a related precoding matrix indicator to the CoMP access point.

39. The wireless communications apparatus of claim 35, wherein the means for applying the precoder applies a next precoder in a set of precoders to a disparate DRS related to the wireless device, and the means for transmitting transmits the disparate DRS to the wireless device.

40. The wireless communications apparatus of claim 39, wherein the means for applying selects the next precoder in the set of precoders based at least in part on a patterned, random, or pseudo-random sequence.

41. The wireless communications apparatus of claim 35, wherein the means for receiving receives the at least one feedback parameter from a serving access point.

42. A computer program product, comprising:
  a non-transitory computer-readable medium comprising:
    code for causing at least one computer to utilize a precoder to precode a dedicated reference signal (DRS) specific to a wireless device;
    code for causing the at least one computer to transmit a DRS-only transmission comprising the DRS without corresponding data signals to the wireless device, the DRS-only transmission indicating a change in precoders;
    code for causing the at least one computer to obtain at least one feedback parameter based at least in part on receiving the DRS at the wireless device;
    code for causing the at least one computer to create at least one data signal comprising at least one data transmission based at least in part on the at least one feedback parameter;
    code for causing the at least one computer to precode the at least one data signal according to the precoder; and
    code for causing the at least one computer to transmit the at least one data signal to the wireless device.

43. The computer program product of claim 42, wherein the computer-readable medium further comprises code for causing the at least one computer to communicate the DRS or the at least one data transmission to a coordinated multiple point (CoMP) access point.

44. The computer program product of claim 43, wherein the computer-readable medium further comprises code for causing the at least one computer to communicate the at least one feedback parameter to the CoMP access point.

45. The computer program product of claim 42, wherein the computer-readable medium further comprises code for causing the at least one computer to communicate the precoder or a related precoding matrix indicator to the CoMP access point.

46. The computer program product of claim 42, wherein the computer-readable medium further comprises:
  code for causing the at least one computer to determine a next precoder in a set of precoders, wherein the precoder is in the set of precoders;
  code for causing the at least one computer to utilize the next precoder to precode a disparate DRS related to the wireless device; and
  code for causing the at least one computer to communicate the disparate DRS to the wireless device.

47. The computer program product of claim 46, wherein the code for causing the at least one computer to determine the next precoder determines the next precoder in the set of precoders based at least in part on a patterned, random, or pseudo-random sequence.

48. The computer program product of claim 42, wherein the computer-readable medium further comprises code for causing the at least one computer to apply a modulation and coding scheme to the at least one data transmission based at least in part on the at least one feedback parameter to generate the at least one data signal.

49. The computer program product of claim 42,
  wherein the code for causing the at least one computer to obtain the at least one feedback parameter obtains the at least one feedback parameter from a serving access point.

50. A wireless communications apparatus, comprising:
  at least one processor configured to precode a dedicated reference signal (DRS) related to a wireless device at least in part by utilizing a precoder;
  a transmitter configured to send a DRS-only transmission comprising the DRS without corresponding data signals to the wireless device, the DRS-only transmission indicating a change in precoders; and a receiver configured to receive at least one feedback parameter regarding the DRS related to the wireless device;

wherein the at least one processor is further configured to generate at least one data signal comprising at least one data transmission based at least in part on the at least one feedback parameter and apply the precoder to the at least one data signal, and wherein the transmitter is further configured to send the at least one data signal to the wireless device.

51. The wireless communications apparatus of claim 50, further comprising:

a backhaul interface that communicates the DRS or the at least one data transmission to a coordinated multiple point (CoMP) access point for transmitting to the wireless device.

52. The wireless communications apparatus of claim 51, wherein the backhaul interface further communicates the at least one feedback parameter to the CoMP access point.

53. The wireless communications apparatus of claim 51, wherein the backhaul interface further communicates the precoder or a related precoding matrix indicator to the CoMP access point.

54. The wireless communications apparatus of claim 50, wherein the at least one processor is further configured to apply a next precoder in a set of precoders to a disparate DRS related to the wireless device, and the transmitter is further configured to send the disparate DRS to the wireless device.

55. The wireless communications apparatus of claim 54, wherein the at least one processor is further configured to select the next precoder in the set of precoders based at least in part on a patterned, random, or pseudo-random sequence.

56. The wireless communications apparatus of claim 50, wherein the receiver is further configured to receive the at least one feedback parameter from a serving access point.

* * * * *